Aug. 11, 1964 P. R. ADAMS ET AL 3,144,637

RECORDING SYSTEM

Filed Nov. 10, 1955 3 Sheets-Sheet 1

INVENTORS
PAUL R. ADAMS
MORTIMER ROGOFF
BY Ernest Fanwick
ATTORNEY

RECORDING SYSTEM

Filed Nov. 10, 1955 3 Sheets-Sheet 2

INVENTORS
PAUL R. ADAMS
MORTIMER ROGOFF
BY Ernest F. Lanwick
ATTORNEY

INVENTORS
PAUL R. ADAMS
MORTIMER ROGOFF
BY Ernest F. Lanevich
ATTORNEY

United States Patent Office 3,144,637

Patented Aug. 11, 1964

3,144,637
RECORDING SYSTEM

Paul R. Adams, Mountain Lakes, and Mortimer Rogoff, Nutley, N.J., assignors to International Telephone and Telegraph Corporation, Nutley, N.J., a corporation of Maryland Filed Nov. 10, 1955, Ser. No. 546,213
7 Claims. (Cl. 340—172.5)

This invention relates to systems for the processing of data including the storage and handling thereof and, more particularly, to a photographic storage system for digital encoded information.

In many fields of endeavor, such as automatic computers, it is necessary to provide means for storing information. Information can be stored in many forms, such as by the use of bistable circuits; secondary emission phenomena used by storage tubes, magnetic recording tape, disks, or wire systems; and by photographic techniques. Although each of the known storage techniques is useful for a particular purpose, we have found that for the permanent storage of a vast amount of information in an easily accessible form in a compact volume, photographic storage techniques appear to be the most desirable. In the past, techniques of exposing the film and thus recording data thereon have been wasteful of the capabilities of the film. Common film emulsions are capable of reproducing 2,500 black and white lines per inch in all directions; and thus, if each intersection of the lines is used for the presence or absence of a binary digit, it is apparent that 6,250,000 binary digits can be stored in that single square inch of film when the total capabilities of the film emulsion are utilized.

At present, known systems of photographic storage are capable of storing approximately 100 binary digits in a square inch of film. It has been found to substantially increase this storage capacity more accurate means of registration for the recording and reading of the photographed binary digits are necessary.

One of the objects of this invention, therefore, is to provide a photographic storage system in which a vast quantity of information can be stored within a relatively small film area in a manner permitting easy and convenient accessibility to the desired information.

Another object of this invention is to produce a system for accurately registering a cathode-ray beam onto a desired portion of target area.

A further object of this invention is the provision of film recorders and reproducers for the storage of digital encoded information which are capable of attaining a digit-density storage of approximately 90,000 per square inch of film surface.

One of the features of this invention is the provision of a data storage system in which the digital code pulses are stored on photographic film by the exposure of the film to a positioned cathode-ray beam and means for controlling the beam position in order to assure that the code pulses which are stored are recorded in a perfectly regular pattern on the film. In order to perform these operations, the light from the electron beam of the cathode-ray tube is passed through means for predetermining a plurality of recording positions and is then split into two portions by means of a partially reflecting mirror which allows one portion of the light to pass onto the film for exposure thereof while causing the remainder of the light from the beam to be utilized in a series of photoelectric cells in order to generate control voltages which are fed back to the deflection system to accurately position the cathode-ray beam with respect to the predetermined storage positions. The information is read out of the system by a film reproducer which is similar to the recording equipment but in which the exposed film is used as a beam-position reference and the reading photoelectric cells are utilized both to obtain a digital output and to correct the deflection of the cathode-ray beam to its proper position.

The above-mentioned and other features and objects of this invention will become more apparent by reference to the following description taken in conjunction with the accompanying drawings, in which.

Figure 1:
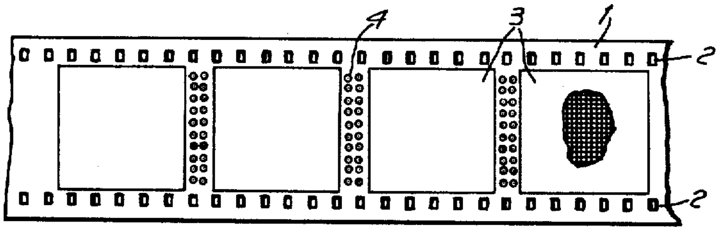
FIG. 1 is a schematic view of the film storage medium for use in the data storage system of this invention.

The storage medium used in the high-density storage system of this invention is shown in FIG. 1 to comprise the usual type of light sensitive or photographic film 1 of indefinite length which may have on one or both edges the drive or sprocket holes 2. A typical length of 35 mm. storage film, as shown in FIG. 1, may be assumed to comprise a plurality of storage frames 3 each substantially 25 x 25 mm. and having interspersed between the storage frames an address or indexing portion of film 4. It is, of course, obvious that the dimensions given and the arrangement of the storage frames and address or indexing portion are merely illustrative; and other arrangements can easily be devised, such as having a plurality of indexing portions at the beginning of each predetermined length of film containing a plurality of storage frames or having the address portion vertically located along the side of each frame. It is equally obvious that the division of the film into frames is merely a matter of convenience.

Figure 2:
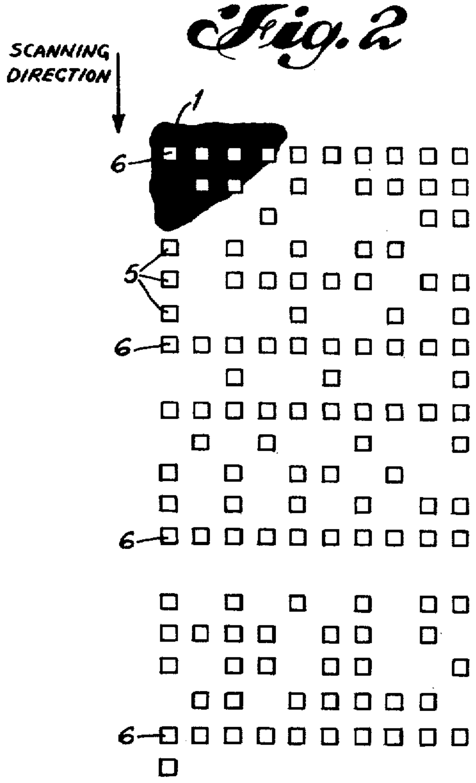
FIG. 2 is a schematic view of an enlarged portion of the film shown in FIG. 1.

Referring to FIG. 2, a portion of a typical storage frame for use in the recording system of this invention is shown to comprise a plurality of clear and opaque areas on the film. The digital code and synchronizing pulses are stored on the film as clear areas with the remainder of the film opaque. The photographic surface is ordinarily exposed to light where the pulse areas are to be located, and as hereinafter explained, a reversal film emulsion is utilized causing the code pulse areas to appear as clear areas on the film while the remainder of the film area is opaque. Each code signal comprising one or more pulses in a given number of pulse positions, such as five, may be recorded transversely or vertically of the film, as may be desired. In FIG. 2, the recording is vertical, line after line, and an indexing pulse 6 is included between every five code pulse positions. These regularly spaced indexing pulses 6 are utilized in the synchronization and registration in the recording and reproducing systems of this invention. The remainder of the pulse positions in the storage frame are utilized to store the digital information. It is well known that common film emulsions are capable of reproducing 2,500 black and white lines per inch in all directions. The ability to resolve this high density of lines allows for the creation of an extremely compact form of digital storage.

By utilizing only a line density of approximately 300 to the inch, in a single square inch of photographic film there are 90,000 available pulse positions each one corresponding to an intersection of a vertical and horizontal line. Thus, these line intersections or spots yield a storage capacity of 90,000 bits in a single square inch of film. The portion of film storage shown in FIG. 2 is illustrative of a five-bit code in which each group of five positions in a column represents the code for one unit of input information. Obviously, any digital code can be utilized in the recording system of this invention.

Figure 3:
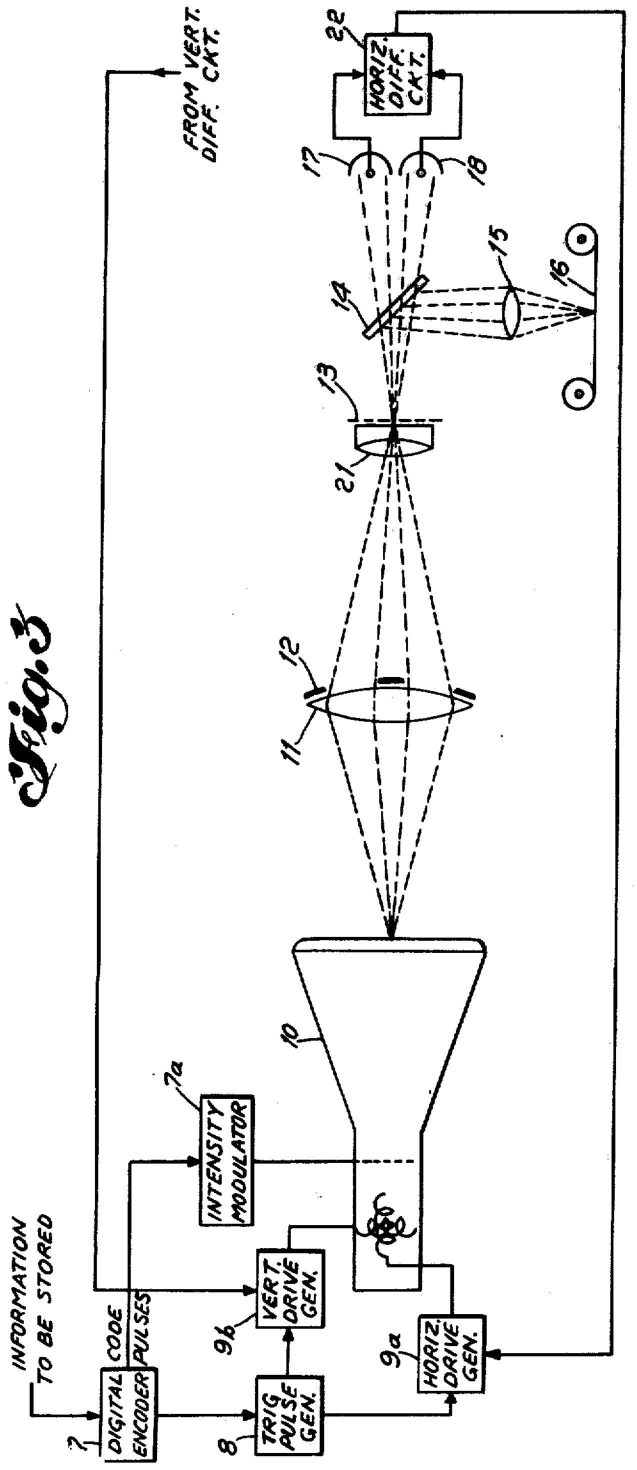
FIG. 3 is a schematic view in plan, partly in block form, of one embodiment of the recording system of this invention.

In FIG. 3 of the drawings, one embodiment of the recording system for use in the data storage system of our invention is therein shown. The information to be recorded or stored is coupled from an information source to an encoding circuit 7 where it is converted into a plurality of code pulses suitable for recording. The output of the encoding circuit 7 is coupled to an intensity modulator **7*a* and is also coupled to a triggering circuit 8 whose output controls the horizontal sweep generator 9*a* and the vertical sweep generator 9*b*. Thus, in one embodiment of the recording system of this invention, each code pulse position causes the vertical sweep generator 9*b* to "step" the beam of the cathode-ray tube 10 to the next recording position in the next row, and at the end of each column of recorded data, the horizontal sweep generator 9*a* steps the beam to the next column position and the vertical sweep generator 9*b*** returns the beam to the start of the column.

This invention utilizes a novel optical arrangement to assure the proper registration of the exposing light source of the photographic films. Obviously, the proper registration of the light source is extremely critical if 90,000 bits of information or, in other words, 90,000 light source positions are to be obtained in a single square inch of film. The cathode-ray tube 10 has a lens 11 placed in front of it to form an image of the cathode-ray tube spot. For purposes of explanation only and in order to make the operation of the photographic recording system of this invention clear, it will now be assumed that the lens 11 is masked by a special aperture plate 12. The special aperture plate 12 comprises a mask in which four holes of equal diameter are punched. Due to the four holes of the mask 12, the image of the cathode-ray tube beam formed by the lens 11 consists of the superposition of four beams of light emerging from the mask or aperture plate 12 just ahead of or just behind the image plane of the lens 11. The image formed consists of four light rays each having passed through its own hole in the mask or aperture plate 12.

Figure 5:
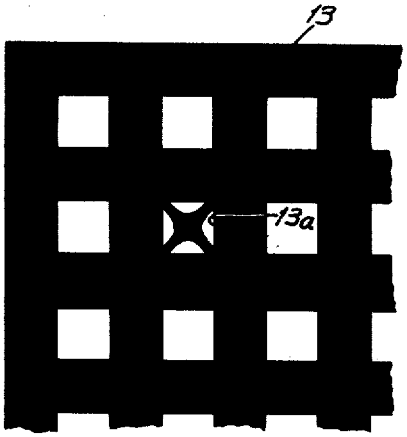
FIG. 5 is a schematic diagram of the graticule plate for use in the recording system shown in FIG. 4.

A graticule 13 is placed just outside of the image plane of the lens 11. As shown in FIG. 5, the graticule 13 consists of a ruled pattern of perpendicular lines in which 300 lines are ruled in vertical and horizontal directions, with equal-width clear spaces between the lines.

Referring to FIG. 5, the relative positions of the four beams of light which were passed through the aperture plate 12 are illustrated as they pass through one opening **13*a* in the graticule 13. It is apparent from FIG. 3 that, since the graticule 13 is not located at the image plane of the lens 11, the four beams are spatially separated from each other as they intersect the plane of the graticule 13. The position of the graticule 13 is such that, when the beam is properly located for the recording of a single digit of information, in other words, when the beam is so located that the spot of a cathode-ray tube 10** will fall on one of the 90,000 intersections of the imaginary lines drawn on the film, as heretofore explained, each beam of light, as it passes through the graticule, is half obscured by the opaque section of the graticule rulings. Such a proper positioning of the four beams is illustrated in FIG. 5.

The recording system of this invention must perform two functions. The first function requires the exposure of photographic film in response to code pulses, and the second requires the proper control of the light beam position in order to assure that the code pulses exposed are properly located in a perfectly regular pattern on the film surface. In order to perform the two functions, the optical path of the recording system comprises two portions. The light from the source 10 passing through the graticule 13 is common to both of the optical paths and serves both functions, but a partially reflecting mirror 14 separates the remaining light path into two sections. A desired percentage of the light passed by the graticule 13 is deflected by the mirror 14 into the camera objective lens 15 and onto the film 16 where the film is exposed in accordance with the light-ray pattern. The remainder of the light passed by the graticule 13 is passed through the mirror 14 and utilized in a series of photoelectric cells 17, 18, 19 and 20 for deflection and control purposes.

The camera objective lens 15 is focused upon the surface of the graticule 13 and causes a sharply defined pattern of light emerging from the clear area of the graticule opening to be focused upon the film surface. Thus, even through the cathode-ray tube spot may be a poorly defined circle of illumination, the exposed image is the sharply defined edge of the rulings of the graticule 13. Lens 21, which is inserted just ahead of the image plane of lens 11, functions as a field lens for this camera allowing all of the light which is gathered by the lens 11 and deflected by the mirror 14 to fall onto the plane of the film 16 contained in the camera, even when the light ray generated by the cathode-ray tube 10 is at an extreme angular position.

The optical system of the deflection control portion of this invention utilizes, in common with the recording portion, the lens 21, the graticule 13, and the partially reflecting mirror 14. In addition to the common portions, the deflection control portion utilizes the photoelectric cells 17–20 shown in FIG. 4. In the deflection control portion, the lens 21 functions as an object lens for the photoelectric cells 17–20. The object plane of the lens 21 is the aperture plate or output of the lens 11. The image plane of the lens 21 falls in the plane that contains the sensitive surfaces of the photoelectric cells 17–20. In the usual case of image formation, when the aperture holes in plate 12 are diffusely illuminated, a real image of these holes is formed on the surface of the photoelectric cells. However, in the recording system of this invention, the only source of illumination is the light obtained from the spot of the cathode-ray tube 10; and the light from this spot, after passing through the aperture holes 12 and the graticule 13, is passed onto the photoelectric cells' surfaces. It does not matter which direction the light beam leaves the cathode-ray tube spot because the lens system, comprising lens 11 and lens 21, causes the rays to pass through the image plane of lens 21; and hence, the illumination at the plane of the photocells 17–20 is confined to stationary regions having an extent equal to the image size of the aperture holes at this plane. As the cathode-ray tube spot moves across the face of the cathode-ray tube 10, the position of these illuminated areas does not change; and hence, the photocells 17–20 are fixed in position and can be utilized to act as control elements in our recording system.

Figure 4:
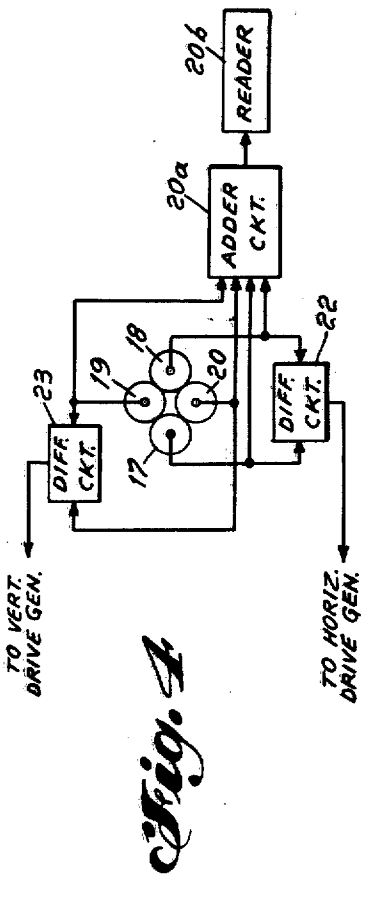
FIG. 4 is a schematic view in elevation in block form of the photocell circuitry for use in the system shown in FIG. 3.

The light detected by the photoelectric cells 17–20 is confined to four areas at the image plane of lens 21, and these four areas each contain the light corresponding to the rays passed through one of the four holes in the aperture plate 12. Thus, each photocell 17–20 has as a source of illumination the light due to one of the four beams emerging from the mask 12 and passed through the graticule 13. If the four beams are properly oriented with respect to the graticule surface, as shown in FIG. 4, then all four photoelectric cells 17–20 are equally illuminated. However, if the position of the beam is not properly oriented, there is a differential illumination falling upon pairs of these photocells 17–18 and 19–20 which is dependent upon the misalignment of the beam. The difference output from each pair of photoelectric cells 17–18 and 19–20 in horizontal and vertical difference circuits 22 and 23, respectively, is taken, and thus the horizontal or left-right pair output is subtracted from each other and the vertical or up-down pair is subtracted from each other in the pair of difference circuits 22 and 23, respectively. These difference signals are indicative of the amount of misalignment in either the horizontal or vertical plane, and these difference signals are utilized as a correction voltage which is coupled back to the horizontal and vertical deflection circuits 9*a* and 9*b* of the cathode-ray tube to maintain the beam position within extremely close tolerances.

It is desirable that synchronization pulses be regularly exposed onto the film after each group of five code pulses in order that the beam deflection control voltages be available at frequent intervals regardless of the information being recorded. Thus, the pulse encoder circuitry 7 generates after each fifth pulse code position a voltage which causes the cathode-ray tube beam to illuminate the screen enabling the photoelectric cells 17–20 to observe the beam position with respect to the rulings of the graticule 13 at least once every six pulse code positions. Through the use of the synchronizing pulses, large deflection errors cannot accumulate even though the value of the information to be recorded is such that no code pulses are illuminated for long periods of time. The pattern of the synchronizing pulses is recorded on the film and used later in the reproduction of the stored image, as well as a source of correcting voltages in the recording system deflection circuitry. The output of the photocells 17–20 may be combined in an adder circuit 20*a* and this combined output coupled to a monitor 20*b* to allow for the monitoring of the stored information.

One important feature of this invention is that it does not require the accurate alignment of the film relative to the exposed image, since the pattern of code pulses and synchronizing pulses is exposed through the graticule 13 and the whole stored code data is perfectly aligned within itself. When reproduced, the reading beam is merely aligned with the field of code pulses on the film without regard to the position of the field relative to the edges of the film, and thus the only physical requirement is that the film position be accurately placed in the image plane of lens 15 in order to maintain a sharp focus of the image.

The exposed film is developed in the normal manner. However, one desirable departure from usual motion picture techniques should be noted. In the reproduction system, it is desirable that the original light image be reversed on the photographic film; and therefore, reversal emulsions should be employed, which may entail an extra step in the development process but is a superior choice than the use of actually printing a contact positive film from the original negative. The reversal processing adds a step of overall exposure and subsequent development in order to reverse the film image and cause the developed film to consist of clear areas, where light struck the original film surface, and opaque areas indicating zero exposure. By providing the clear areas for the exposed code pulse position, the operation of the film reproducer is simplified; and thus, the addition of the reversing step substantially reduces the complexity of the film reproducer.

Figure 6:
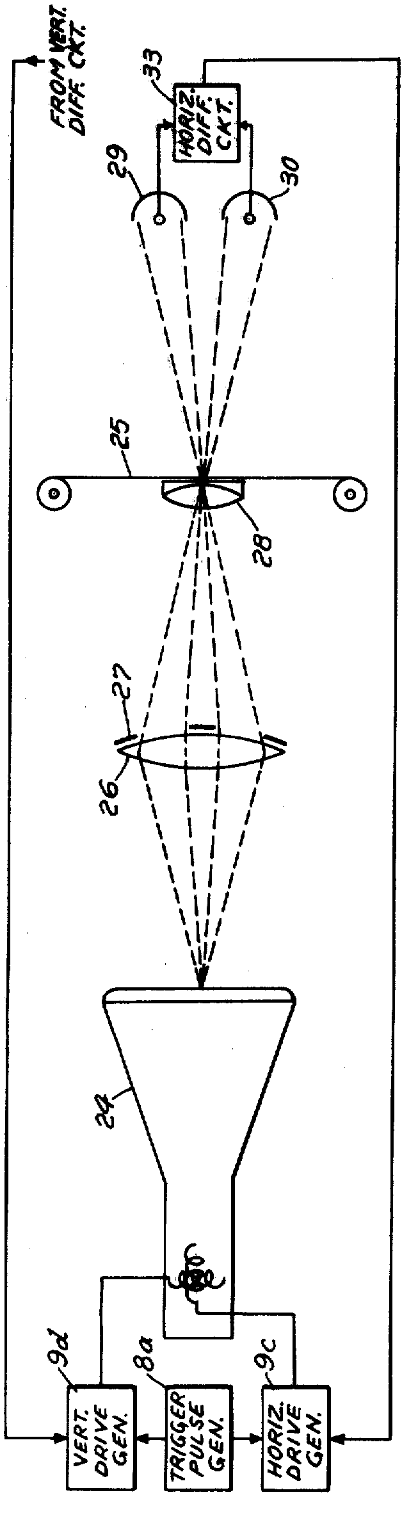
FIG. 6 is a schematic view in plan, partly in block form, of the reproducing or readout portion of the data storage system of this invention.
Figure 7:
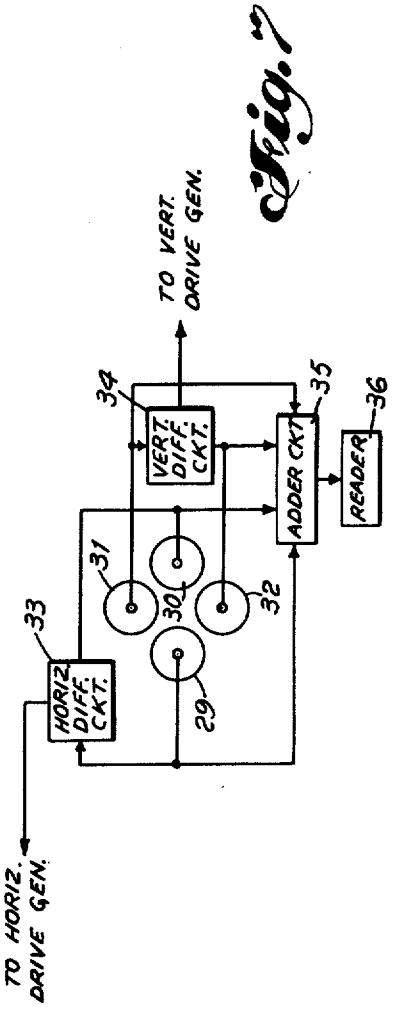
FIG. 7 is a schematic view in elevation in block form of the photocell circuitry for use in the system shown in FIG. 6.

Referring to FIG. 6, one embodiment of a readout or data storage reproduction system in accordance with the principles of this invention is shown to comprise equipment similar in nature to the recording equipment and containing many of the same elements. A cathode-ray tube 24 is utilized as a source of illumination; and its spot, which is positioned by means of the horizontal and vertical drive generators 9*c* and 9*d* triggered by the output of generator 8*a*, is imaged onto the focal plane of the exposed film 25 by means of a lens 26. Once again merely for purposes of illustration, the lens 26 will be assumed to be masked by an aperture plate 27 having four large holes of equal diameter cut therein. Thus, the image of the light spot from the cathode-ray tube 24 consists of the superposition of four beams emerging from this aperture plate. By shifting the exposed film to a position just beyond the image plane of lens 26, the exposed synchronizing pulses and code pulses formed on the exposed film comprise the counterpart of the graticule 13 which was used in the recording system. A second lens 28 is placed just ahead of the exposed film 25 and is used to illuminate four photoelectric cells 29–32 which are located in back of the film 25. The amount of light energy due to the brightness of the spot image received by each of these four photoelectric cells 29–32 is dependent upon the spatial position of the four light beams relative to a clear area or code pulse exposed onto the film 25. If properly oriented, all four cells 29–32 receive light of equal brilliance. If the beam is misaligned either horizontally or vertically, differences in the paired photoelectric-cell outputs are utilized to correct the beam position; and the correction signals are coupled back to the cathode-ray deflection circuits 33 and 34.

The sum of the electric outputs of all four photoelectric cells 29–32 is the required code pulse and is obtained from an adder circuit 35 whose output is coupled to a reader 36. Thus, if a code pulse is exposed onto the film 25 causing a clear area, the total light emitted by the cathode-ray tube 24 is received as the sum of the outputs of all four photoelectric cells 29–32; and all the light passing through the film 25 is utilized to form the amplitude of the recovered code pulse, while the difference in the photocell outputs obtained from difference circuits 37 and 38 are utilized to correct the beam position.

Figures 8A, 8B:
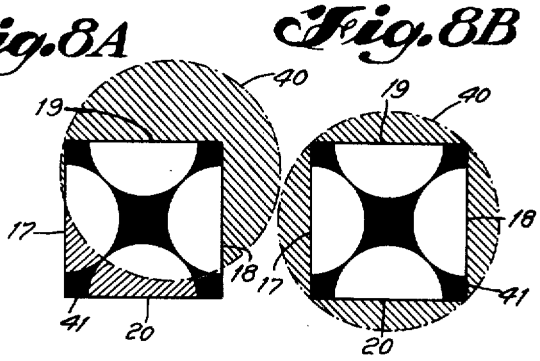
FIGS. 8A and 8B are schematic diagrams of the light energy received by the photocells used in this invention.

Heretofore, it has been assumed that a four-hole aperture mask plate was associated with the first lens 11 and 26 of the recording and reproducing systems, respectively. This was done merely for purposes of illustration and for ease of explanation, but the physical mask is not required in practice. Removal of the aperture plate causes the system to operate as before. The four holes located in the mask were utilized to separate the optical paths for the light used by each of the four photocells in each system. It has been shown that the photocells receive stationary images whose brightness varies as the beam shifts its position relative to the graticule rulings, but if this aperture plate is removed, the identical effect occurs. The photocells continue to receive light energy depending upon the relative position of the cathode-ray tube beam, and the camera photographs a brighter spot as seen through the graticule since the central rays emerging from lens 11 are utilized along with the rays that heretofore had been assumed as being passed through the aperture holes. Obviously, the elimination of the aperture plate simplifies the construction of the lens and allows more light to be utilized. Thus, referring to FIG. 8A, the beam of light 40 emitted from the face of the cathode-ray tube is poorly defined until it is passed through the graticule opening 41 which "sharpens" the edges. If the beam 40 is misaligned, as illustrated in FIG. 8A, the pairs of photocells 17–18 and 19–20 produce a difference output. However, if the beam 40 is properly aligned, as shown in FIG. 8B, each photocell 17–20 receives the same quantity of light energy.

The type of code visualized for the film storage system of this invention would typically use a five-bit code separated by a synchronizing pulse. This is substantially similar in form to the standard teletype codes, and thus the information can be read out and printed in plan language on a standard teleprinter machine.

Alternately, it may be desirable to utilize the control system of this invention to cause an illuminated image to be maintained in a stationary relation to any arbitrary portion of the image plane. This can be accomplished by utilizing the same graticule rulings to encompass the image and photocells on which is focused the image passed by the graticule rulings.

While we have described above the principles of our invention in connection with specific apparatus, it is to be clearly understood that this description is made only by way of example and not as a limitation to the scope of our invention as set forth in the objects thereof and in the accompanying claims.

We claim:

1. An information storage system comprising a cathode-ray tube including means for generating an electron beam and target means to luminesce when said electron beam impinges thereon, optical means defining a path for the light output of said cathode-ray tube, deflection means for said electron beam for varying the position of said beam responsive to each unit of information to be stored, means including a common lens and a graticule for predetermining a plurality of storage positions for said light energy passing thereto, pairs of mutually perpendicular light responsive means disposed in a common transverse plane relative to said light path for generating a difference signal between the members of each pair in accordance with the relative position of said light path with respect to said pairs and distribution of light from any one of said storage positions, and means for coupling said generated signal to said deflection means to adjust the position of said path of energy relative to said storage position predetermining means for equal illumination of each member of said pairs.

2. A binary digit information storage system comprising a cathode-ray tube including means for generating an electron beam and target means to luminesce when said electron beam impinges thereon, optical means defining a path for the light output of said cathode-ray tube, photographic means disposed relative to said light path to record the light output and position of impingement of the electron beam on the target means of said cathode-ray tube, intensity adjusting means for adjusting the output of said cathode-ray tube responsive to the intelligence of the information to be stored, deflection means for said electron beam for varying the position of said beam responsive to each unit of information to be stored, means including a common lens and a graticule for predetermining a plurality of storage positions for said light energy, said graticule having a plurality of regularly alternating transparent and opaque areas arranged in mutually perpendicular planes on a common surface, means for directing the light path between said cathode-ray tube and said recording means relative to any one of said predetermined storage positions, pairs of light responsive devices disposed relative to said light path each positioned on respective mutually perpendicular axes in a common transverse plane to receive a portion of the light energy passing through said common lens and a given portion of any one of said predetermined storage positions, means to generate signals responsive to the difference in light energies received by each member of a said pair of light responsive devices, and means for coupling said generated signal to said position varying means to adjust the position of said path of energy relative to said storage position predetermining means to provide equal illumination of said light responsive devices.

3. An information storage system comprising a source of code pulses, a source of light energy responsive to said pulses, first optical means to form an image of said light source at a given first image plane, graticule means located adjacent said first image plane to define a plurality of storage positions, pairs of stationary photoelectric cells arranged on respective mutually perpendicular axes in a common transverse plane, common optical means to cause the light passed by any portion of said graticule means to be focused on said common plane and distributed onto all of said photoelectric cells, and means responsive to the difference outputs between the members of each said pair of photoelectric cells to adjust the position of said light source relative to said graticule for equal illumination of said cells.

4. An information storage system comprising a cathode-ray tube including means for generating an electron beam and target means to produce a luminescent indication of the impingement of said electron beam thereon and having means to deflect said luminescent portion in first and second mutually perpendicular directions having first optical means having a given image plane defining a path for the light output of said cathode-ray tube, photographic means disposed relative to said light path to record the light output and position of impingement of the electron beam on said target means of said cathode-ray tube, intensity adjusting means for adjusting the output of said cathode-ray tube responsive to the intelligence of the information to be stored, means to actuate said first and second positioning means for said electron beam responsive to each unit of information to be stored, a graticule for predetermining a plurality of storage positions for said light energy, second optical means located near said image plane to collect said light energy and focus said energy onto said light recording means, a plurality of light responsive devices, pairs of said devices being arranged in respective mutually perpendicular planes, third optical means positioned between said first optical means and said graticule forming an image of said light path relative to said predetermined plurality of storage positions on said light responsive devices, means directing said light energy from said graticule toward said light recording means and toward said light responsive devices, means for generating signals responsive to the difference in distribution of light on said respective pairs of light responsive devices in each plane, and means for coupling said generated signal to said position varying means to adjust the storage position of said light path relative to said position predetermining means for equal illumination of said devices.

5. A readout system for digital information stored in a regular pattern as light-transparent portions on a storage medium comprising a cathode-ray tube electron beam source of light, a storage medium having a plurality of horizontal rows and vertical columns of alternating light transparent and opaque areas on a common surface representing the information stored, first optical means directing said source of light onto said storage medium, first and second deflecting means to vary the position of said source in a horizontal and a vertical direction, respectively, a plurality of pairs of light responsive means arranged in at least one horizontal row and one vertical column, second optical means including a focusing lens adjacent to the storage medium to cause the light passed through any one of the transparent areas of said storage medium to stimulate all of said light responsive means, means combining the outputs of all of said light responsive means to produce a signal responsive to the information stored on said medium, means for comparing the outputs of said pair of light responsive devices in said horizontal row to produce a first difference signal, means to compare the outputs of said pairs of light responsive means in said vertical column to produce a second difference signal, and means to feed back said first and second difference signals to said first and second light source positioning means, respectively, to adjust the position of said light source relative to said regular pattern for equal illumination of said light responsive means.

6. The positioning control of claim 5, wherein a digital pulse encoder is connected to each of said deflecting means.

7. The positioning control of claim 6, wherein an intensity modulator is connected between said encoder and said cathode-ray tube to control the intensity of said electron beam in accordance with the encoded pulses.

References Cited in the file of this patent

UNITED STATES PATENTS

| | | |
|---|---|---|
| 2,596,741 | Tyler et al. | May 13, 1952 |
| 2,659,828 | Elliott | Nov. 17, 1953 |
| 2,830,285 | Davis et al. | Apr. 8, 1958 |